(12) United States Patent
Zimmermann et al.

(10) Patent No.: US 7,870,946 B2
(45) Date of Patent: Jan. 18, 2011

(54) DEVICE FOR NON-CONTACT CONVEYING, HANDLING AND STORAGE OF STRUCTURAL ELEMENTS AND MATERIALS

(76) Inventors: Josef Zimmermann, Trothengasse 4, 93047 Regensburg (DE); Adolf Zitzmann, Tannenmühle 1, 92552 Teunz (DE); Michael Schilp, Lörenskogstr. 14, 85748 Garching (DE); Tobias Bolig, Theresienstr. 45, 80333 München (DE)

( * ) Notice: Subject to any disclaimer, the term of this patent is extended or adjusted under 35 U.S.C. 154(b) by 617 days.

(21) Appl. No.: 10/595,786

(22) PCT Filed: Nov. 11, 2004

(86) PCT No.: PCT/DE2004/002494
§ 371 (c)(1),
(2), (4) Date: Jul. 23, 2008

(87) PCT Pub. No.: WO2005/047148
PCT Pub. Date: May 26, 2005

(65) Prior Publication Data
US 2009/0014283 A1 Jan. 15, 2009

(30) Foreign Application Priority Data
Nov. 11, 2003 (DE) .................. 103 52 944

(51) Int. Cl.
*B65G 35/00* (2006.01)
*G10K 11/00* (2006.01)

(52) U.S. Cl. .................. 198/630; 198/750.1; 198/759; 181/0.5

(58) Field of Classification Search ............. 198/630, 198/752.1, 759; 73/570.5; 181/0.5
See application file for complete search history.

(56) References Cited

U.S. PATENT DOCUMENTS

| 4,284,403 | A | * | 8/1981 | Rey | 432/1 |
| 4,393,708 | A | * | 7/1983 | Barmatz et al. | 73/570.5 |
| 4,777,823 | A | * | 10/1988 | Barmatz et al. | 181/0.5 |
| 5,890,580 | A | * | 4/1999 | Hashimoto et al. | 198/619 |
| 6,779,650 | B2 | * | 8/2004 | Takasan et al. | 198/630 |
| 6,994,207 | B2 | * | 2/2006 | Takasan et al. | 198/752.1 |

* cited by examiner

*Primary Examiner*—Mark A Deuble
(74) *Attorney, Agent, or Firm*—Henry M. Feiereisen; Ursula B. Day

(57) ABSTRACT

A device for generating a floating state of an object by sound waves includes a rigid support structure having a top surface for absorbing forces generated by the gravitation or acceleration of the levitating object and perpendicularly acting on the top surface. A thin oscillatory element is arranged in parallel to the top surface. Further provided is a vibration generator for making the thin oscillatory element vibrating and levitating above the top surface so that the object is levitating above the thin oscillatory element without contacting it.

18 Claims, 4 Drawing Sheets

DEVICE FOR NON-CONTACT CONVEYING, HANDLING AND STORAGE OF STRUCTURAL ELEMENTS AND MATERIALS

BACKGROUND OF THE INVENTION

The present invention relates to device for non-contact or low-contact conveying of structural elements or materials along a conveying track. Furthermore, this invention relates to device for non-contact or low-contact handling and storing of structural elements and materials.

Several prior art technologies for moving or holding parts are known. For example, conveying systems utilizing magnetic repulsive forces or air cushions are widely used. Air cushions can be generated by air flowing through the nozzles which a plate is provided with. Another technology of generating air cushions is that of using sound waves.

A conveying device is described in the patent document U.S. Pat. No. 5,810,155, which is based on the principle of sound pressure. Further references concerning sound pressure and acoustic levitation are given in the literature as follows:

"Comparative contemplation on non-contact positioning of single droplets in aerodynamic, acoustic and electric force fields" by E. G. Lierke. Published in "Forschung im Ingenieurwesen", vol. 61 (1995) 7/8, pages 201-216.

"Acoustic positioning—a comprehensive view on fundamentals and applications" by E. G. Lierke. Published in "Acustica" 82 (1996), pages 220-237.

The advice described in U.S. Pat. No. 5,810,155 comprises a conveying rail, to the front portion of which a vibration generator (source) is connected to excite this part so that a travelling wave is generated. The travelling wave initiated in this way extends along the conveying rail in conveying direction. The rear portion of this conveying rail is provided with a unit (drain) for converting the mechanic energy of the travelling wave into electric energy. This unit serves to prevent the travelling wave from being reflected and thereby, from moving back.

Objects positioned on the conveying rail are moved along it by the travelling air cushion generated between this rail and the bottom face of each of the objects in the direction to said unit. Results of trials show that it is possible to convey objects in this way, in principle.

Further structures of such prior art devices are described in the documents DE 19916922, DE 19916923, DE 19916856 and DE 19916872.

All of the known structures of near-field sound levitation are based on that a structural element is levitated and kept in this state in a non-contact way on a vibrating and, therefore, sound emitting surface. In order to gain such a state, it is required to cause this surface to vibrate. An expert in this field certainly knows that the oscillatory response of a solid body is mainly determined by the material and the dimensions thereof that is by its shape. For example, when a transporting track for transporting flat structural elements is to be constructed for a transport system, it has to be designed so that it is capable of vibrating and satisfies boundary conditions concerning the spatial requirements of such a transport system. However, it is difficult to design a device to be used for non-contact transporting, storing or handling of structural elements based on sound levitation, as it must have a predetermined geometric shape and predetermined dimensions to give it those vibration properties necessary for gaining levitation, but on the other hand, should have a totally different geometric shape with respect to the dimensions and weight in order to fulfil its task as a transport track, storing device, holding or handling device.

To elucidate this problem, it must be emphasized, that for example, a transport rail, on which an air cushion is generated by nozzles, is not subject to the limitation mentioned above, as there is the possibility to guide the air to the nozzles through channels which can randomly be configured and arranged. As flow effects inevitably occurring with certain technologies using gaseous media are not desired, such systems can not be installed everywhere.

SUMMARY OF THE INVENTION

Therefore, object of this invention is to provide a levitation technology based on sound vibrations, with which the disadvantages mentioned above are eliminated.

According to one aspect of the invention, this object is gained by a device for levitating an object by sound waves, wherein the object comprises at least one surface portion suited for levitation and arranged opposite to a sound-emitting surface, wherein the device comprises the following features: a rigid support structure having a top surface for absorbing forces generated by the gravitation or acceleration of the levitating object and perpendicularly acting on said top surface, a thin oscillatory element arranged in parallel to the to surface of support structure, vibration generating means for causing the thin oscillatory element to vibrate so that it is levitating above said top surface without contacting it and the object is levitating above the thin oscillatory element.

There is provided a device for levitating an object by sound waves, wherein the object must comprise at least one surface portion suited for sound levitation. Preferably, such a surface shall be hard (sound reflecting) and arranged opposite to a sound emitting surface in order to allow the object to be levitated. It is also possible to levitate powdered or granulated materials, but in this case, a totally non-contact levitation state can not be gained. According to this invention, the device comprises a rigid support structure. This support structure can be made of materials such as metals, plastic, glass, ceramics or compound materials. There is no limitation as the production method is concerned, so that casting and injection moulding for example can also be used for making such a structure. The support structure should be capable of absorbing those forces generated by gravitation or acceleration of the levitating object and acting onto it. Furthermore, the top surface of support structure should withstand dynamic loads which are generated by the sound waves used to levitate the object or material. A thin oscillatory element is arranged in parallel to the top surface of support structure. Vibration generating means cause this thin oscillatory element to vibrate so that it is kept floating without contacting the top surface of the support structure. Vibrations can be generated in different ways, e.g. by external or internal excitation. In general, the thin oscillatory element can be made of any material having great strength and being flexible, such as steel, non-ferrous alloys, plastic and compound material, as far as they are excited externally. Oscillatory elements can also be made of a material in shape of a film, which is excited internally to vibrate by using the inverse piezoelectric effect. The top surface shape of support structure must not necessarily be plane.

According to this invention, by separating the functions "bearing" and "vibrating" from each other, a change of paradigm in the field of sound levitation was gained. For the first time, there is the possibility to design a conveying track without having to consider the vibration behaviour thereof. In other words, a conveying track can be designed optimally without considering parameters such as weight, resistance to aggressive media, material cost and the like thereof. In addition, the designer of oscillatory elements is subject to few restrictions only and can chose from a great variety of materials and technologies.

Such applications or technologies are especially advantageous where standardized spatial conditions are existent. Wafer production is a technology of such type. According to the present invention, for the first time, it is possible to provide devices which can be adapted to the spatial conditions necessary for realizing this technology.

According to another feature of the invention, the thin oscillatory element is a sheet made of metal or a plate made of plastic which has vibration characteristics similar to those of the metal sheet. The vibration device is a generator for generating mechanic vibrations, which are transmitted to the metal sheet or the plastic plate.

According to another feature of the invention, the thin oscillatory element is a piezoelectric film exited electrically. Experts in this field certainly know such films, which utilize the inverse piezoelectric effect to generate mechanic thickness vibrations so that an inventive activity for selecting a piezoelectric film suited for the technological application to be realized is not required. Films of such kind are advantageous in that a wide range of vibration frequencies can be set electrically.

According to another feature of the invention, the thin oscillatory element is a magnetostrictive-excited film. Generation of elastic deformations of magnetostrictive materials in a magnetic field is also well known. With this application, the electromagnets are preferably integrated in the support structure made of a non-magnetic material.

According to another feature of the invention, the thin oscillatory element is an electrostrictive-excited film, wherein the material comprises electrostrictive properties, and a device for electrostrictive excitation is provided.

According to another feature of the invention, vibrations are transferred by a mechanically fastened coupling device. This is especially advantageous in that several thin oscillatory elements can simultaneously be excited by a single device.

According to another feature of the invention, coupling of vibrations is performed not directly but via an intermediate medium.

According to another feature of the invention, the intermediate medium is a gas which causes the thin oscillatory element to vibrate when flowing over peripheral portions thereof.

According to another feature of the invention, the intermediate medium is a liquid which causes the thin oscillatory element to vibrate when flowing over peripheral portions thereof.

According to another feature of the invention, the thin oscillatory element is driven so that it vibrates with different frequencies and/or amplitudes. By this measure, it is possible to increase the amplitudes, for example, which cause an object rectilinearly moved along a conveying track to change its moving direction.

According to another feature of the invention, several thin oscillatory elements are arranged and can be driven selectively. In case that these elements are arranged along the conveying track on the same plane and are driven differently, a change of moving direction can also be forced so that a switching function is gained.

According to another feature of the invention, the top surface of support structure is provided with at least one suction orifice through which air or gas is sucked. Also, the thin oscillatory element is provided with at least one orifice which, however, is not in line with the suction orifice. When a negative pressure is generated at the suction orifice, the thin oscillatory element is pressed to the top surface of support structure by the atmospheric pressure. Thereby, the bendable thin oscillatory element adapts to the contour of top surface and is stabilized locally. Also, with this embodiment, the vibrational movement of the thin oscillatory element prevents it from contacting the top surface of support structure so that it levitates in parallel to that surface. As the thin oscillatory element is provided with at least one orifice, the device of this embodiment is suited to be used as gripping device which allows a flat structural element to be gripped from above, that is to be sucked.

In case that the thin oscillatory element is not provided with orifices, this embodiment is especially suited to design conveying tracks the top surface of which is not plane.

According to another feature of the invention, a device for conveying using the devices according t claims 1 to 12 is claimed, wherein conveying is understood as moving of objects on a horizontally or slightly inclined track from a position A to a position B.

According to another feature of the invention, a device for gripping using the devices according to the invention is claimed, wherein gripping is understood as taking-up, conveying and taking-off of structural elements. For example, such a device can be integrated in a multiple-joint robot.

According to another feature of the invention, a storing and holding device using the devices according to the invention is claimed. For example, such a device allows parts to be stored intermediately in a non-contact way until the next working step.

According to another feature of the invention, a bearing using the devices according to the invention is claimed, in which a shaft performs a non-contact rotation movement. The support structure of this device is formed by a tube. The thin oscillatory element is arranged at the inside wall of the tube without contacting it.

According to another aspect of the invention, a method for levitating an object is claimed, wherein the object comprises at least one surface portion suited for levitation and positioned opposite to a surface which emits sound waves, and wherein the method comprises the following steps:

proving of a rigid support structure having a top surface for absorbing forces generated by the gravitation or acceleration of the levitating object and perpendicularly acting on the top surface, providing of a thin oscillatory element arranged in parallel to the top surface of support structure, providing of vibration generating means which cause the thin oscillatory element to vibrate so that it is levitating above the top surface of support structure without contacting it and the object is levitating above the thin oscillatory element without contacting it.

BRIEF DESCRIPTION OF THE DRAWING

In the following, embodiments of the invention are described in connection with the accompanying schematic drawings.

DETAILED DESCRIPTION OF PREFERRED EMBODIMENTS

Figure 1:
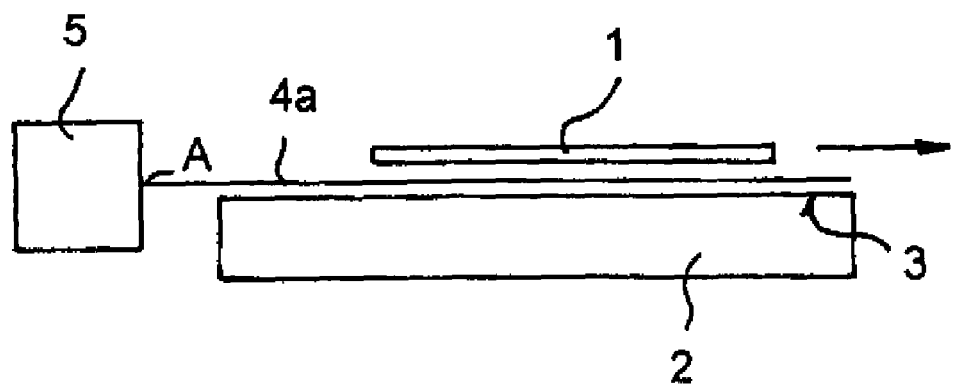
FIG. 1 shows a first embodiment of the invention.

FIG. 1 shows a side view of a horizontally arranged transport track along which a flat disc 1 is to be conveyed in the direction indicated by an arrow. A support structure 2 has a top surface 3 which prevents it from being deformed by the weight of the disc or by other actions, i.e. the support structure 2 is a rigid structure. A 0.05 mm thick sheet 4a made of spring steel is arranged above the top surface 3 of support structure, which contacts this surface when not excited. At its portion A, the sheet 4a is mechanically fastened to a vibrator 5. When excited by the vibrator 5 at a frequency of 30 kHz, the sheet 4 is released from the top surface 3 of support structure 2 and levitated above it at a distance of about 0.02 mm, that is, it does not contact the top surface. The frequency necessary for gaining this state is selected by an expert, with the geometry and material properties of the sheet considered. When a wafer is laid onto the sheet, it is also levitated and can be moved by any of the acceleration means known from the prior art. Accelerating means include the gravitational force acting on an inclined conveying track and irradiating by sound.

Figure 2:
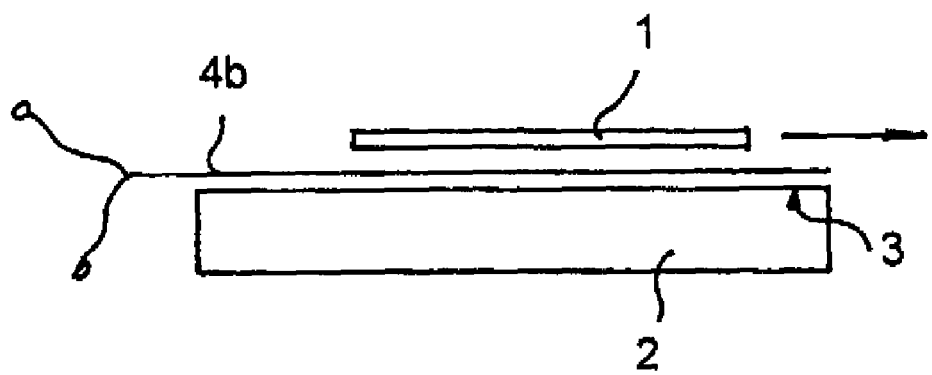
FIG. 2 shows a second embodiment of the invention.

The arrangement shown in FIG. 2 is the same as that shown in FIG. 1. However, instead of the sheet made of spring steel, a piezoelectric film 4b having a metallized surface is used. Several piezoelectric films made of strong ceramics or of polymer are available. The metallized surface of the piezoelectric film is provided with terminals which are electrically connected to a frequency synthesizer. Piezoelectric polymer-films are advantageous in that there is the possibility to select a frequency of thickness vibration within a wide range.

Figure 3:
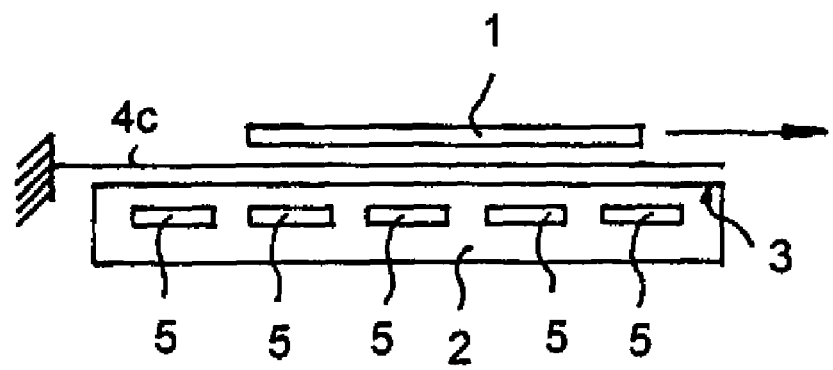
FIG. 3 shows a third embodiment of the invention.

Also, the arrangement shown in FIG. 3 is the same as that shown in FIG. 1. However, instead of the sheet made of spring steel, a film 4c made of a magnetostrictive material is used. Solenoid coils 5 are installed in the support structure made of plastic material, which, when a voltage is applied, generate an alternating magnetic field that excites the film to vibrate.

Figure 4:
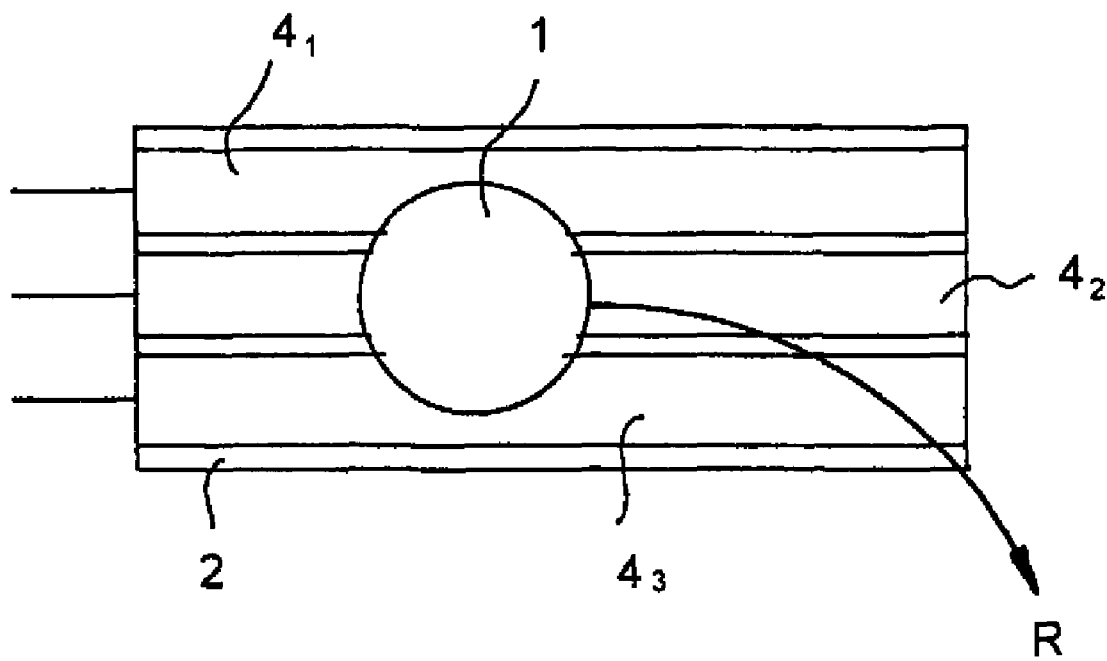
FIG. 4 shows a fourth embodiment of the invention.

FIG. 4 is the top view of the transport track shown in FIG. 1; however, this support track is provided with three sheets $4_1$, $4_2$, $4_3$ made of spring steel, which are individually driven. This arrangement can function as guide and as switch, too. In case that the vibrations of sheet $4_1$ and sheet $4_3$ are greater than the vibration of sheet $4_2$, disc 1 is centred and guided along the track in the middle thereof without any external guide. In case that the vibration of sheet $4_1$ is greater than that of sheet $4_2$ and the vibration of sheet $4_2$ is greater than that of sheet $4_3$, disc 1 is moved in the direction indicated by an arrow R, so that this arrangement serves as a switch.

Figure 5:
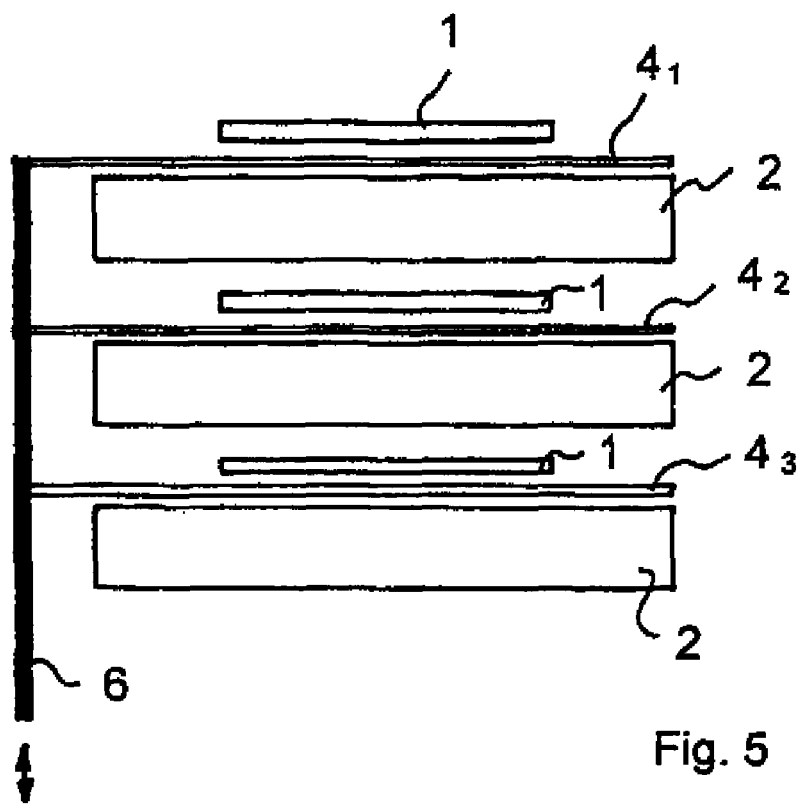
FIG. 5 shows a fifth embodiment of the invention.

FIG. 5 shows a holding device for holding or storing three discs one over the other. The support structure comprises 3 decks, wherein the sheets $4_1$, $4_2$ and $4_3$ are connected to the vibration generator via a coupling unit 6. This device allows the discs to be stored intermediately until the next treating operation.

Figure 6A:
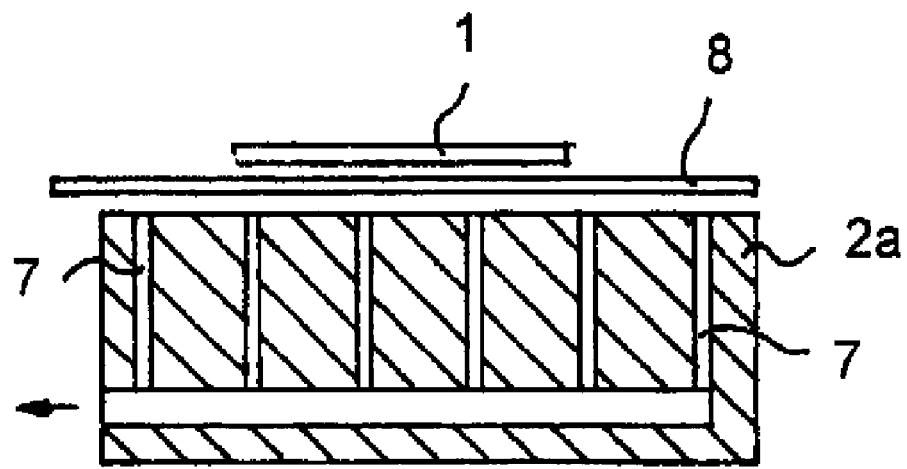
FIGS. 6a, 6b shows a side view and a top view, respectively, of a sixth embodiment of the invention.
Figure 6B:
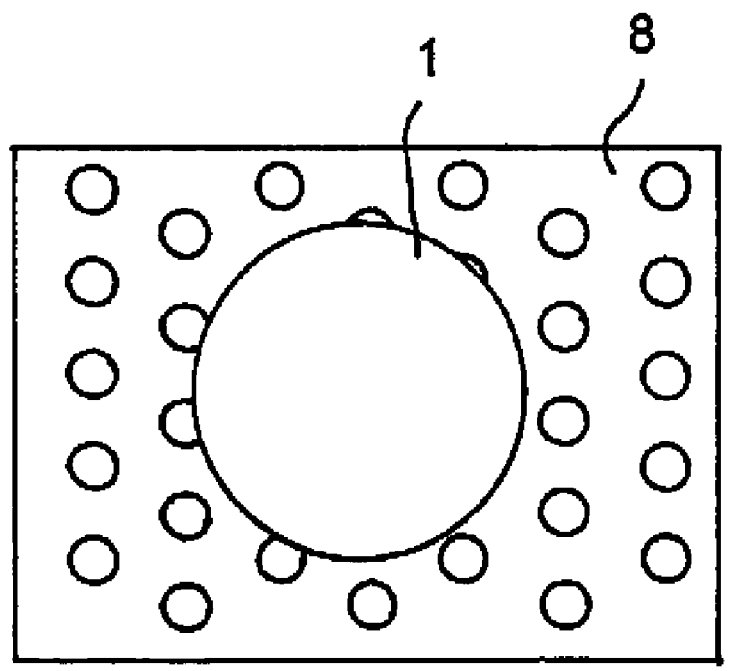

FIG. 6a shows a side view and FIG. 6b the top view of a gripping device, with the support structure 2a of which comprising suction holes 7. An apertured sheet 8 is arranged above the support structure. As soon as the gripping device is activated, preferably at first, the vibration generator is switched on, in order to levitate the apertured sheet 8. Then, a negative pressure is generated at the suction holes 7 so that the apertured sheet 8 is caused to move in the direction to the surface of support structure. That is, due to the suction effect, the vibrating apertured sheet 8 is fixed opposite to the top surface of support structure at a certain distance to it. When a disc 1 is levitated above the apertured sheet 8, it is fixed according to the same principle as the apertured sheet 8 is fixed. The gripping device can be installed in a multiple-joint robot so that the disc is movable on freely selected paths inside a room. By creating special flow conditions, lateral fixing of the disc may be dispensed with.

Figure 7:
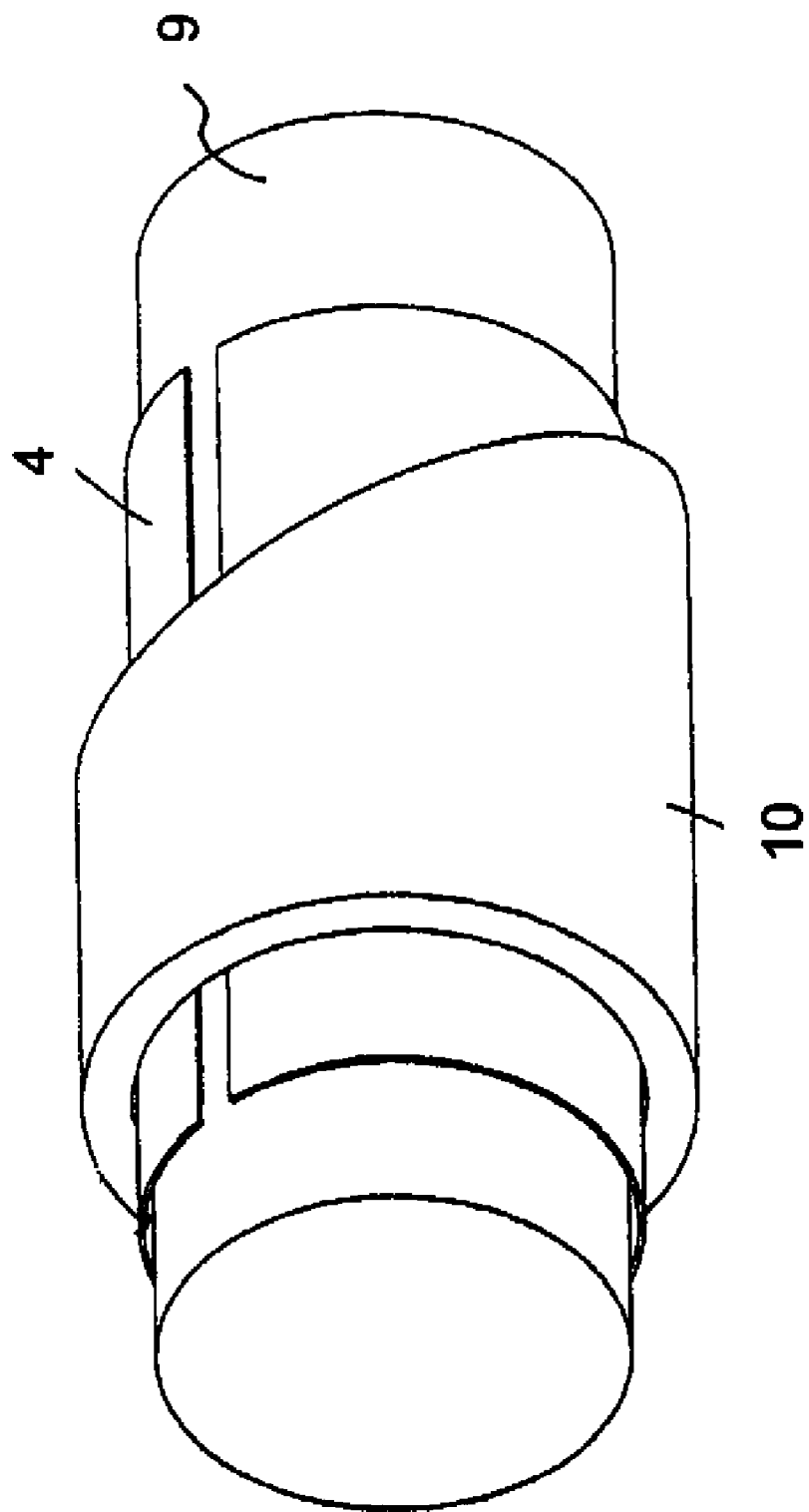
FIG. 7 shows a seventh embodiment of the invention.

FIG. 7 shows a bearing in which a shaft 9 rotates without contacting it. The support structure is formed by a tube 10. The thin oscillatory element 4 is arranged at the inside wall of tube 10.

As is clear from the description, a closed (tube-like) conveying track can be built-up based on this principle, in which a low friction resistance arises when powdered materials are conveyed, for example.

What is claimed is:

1. A device for levitating an object by sound waves, comprising:
    a rigid support structure having a top surface for absorbing forces generated by gravitation or acceleration of a levitating object and perpendicularly acting on the top surface;
    a thin oscillatory element arranged in parallel to the top surface of support structure; and
    a vibration generator for causing the thin oscillatory element to vibrate such that the oscillatory element levitates above the top surface without contacting it and the object levitates above the thin oscillatory element as a consequence of at least one surface portion of the object suited for levitation and arranged in opposition to the oscillatory element.

2. The device of claim 1, wherein the thin oscillatory element is a member selected from the group consisting of metal sheet and plastic plate having similar oscillatory properties as the metal sheet, said vibration generator constructed to generate mechanical vibrations and coupled to the member so that the vibrations are transferred to member.

3. The device of claim 1, wherein the thin oscillatory element is an electrostrictive-excitable piezofilm.

4. The device of claim 1, wherein the thin oscillatory element is a magnetostrictive-excitable film having magnetostrictive properties, and further comprising a unit for magnetostrictive excitation of the film.

5. The device of claim 1, wherein the thin oscillatory element is an electrostrictive-excitable film having electrostrictive properties, and further comprising a unit for electrostrictive excitation of the film.

6. The device of claim 2, further comprising a mechanically fastened coupling device for coupling the vibration generator and the member.

7. The device of claim 2, further comprising an intermediate medium for coupling the vibration generator and the member.

8. The device of claim 7, wherein the intermediate medium is a gas.

9. The device of claim 7, wherein the intermediate medium is a liquid.

10. The device of claim 1, wherein the thin oscillatory element is controlled so that it vibrates with different frequencies and/or amplitudes.

11. The device of claim 1, further comprising a plurality of said oscillatory elements which are selectively controllable.

12. The device of claim 1, wherein the top surface of the support structure is provided with at least one suction orifice for air or gas, and the oscillatory element is provided with at least one hole, wherein suction conditions are set such that the object positioned above the hole is sucked and held at a determined distance to a surface of the thin oscillatory element by an air film generated by the vibrating oscillatory element.

13. The device of claim 1 for transporting the object.

14. The device of claim 1 for use in a gripping device.

15. The device of claim 1 for use in a storing and holding device.

16. The device of claim 1 for use in a bearing, with the support structure constructed in the form of a tube.

17. A method for levitating an object by sound waves, wherein the object comprises at least one surface portion suited for levitation and arranged opposite to a sound-emitting surface, said method comprising the steps of:

provinding a rigid support structure having a top surface for absorbing forces generated by gravitation or acceleration of a levitating object and perpendicularly acting on the top surface;

providing a thin oscillatory element arranged in parallel to the top surface of support structure; and providing vibration generator which cause the thin oscillatory element to vibrate so that it is levitating above the top surface of the support structure without contacting it and the object levitates above the thin oscillatory element without contacting it.

18. A method for levitating an object by sound waves, comprising the steps of:

placing at least one surface portion of an object suited for levitation in opposition to a thin oscillatory element; and causing the oscillatory element to vibrate, thereby effecting a levitation of the oscillatory element above a top surface of a rigid support structure and levitation of the object above the oscillatory element.

* * * * *